United States Patent Office
3,350,330
Patented Oct. 31, 1967

3,350,330
SILOXANE-BASED, NON-SKID COATING
COMPOSITION
Carl G. Cash, Elnora, James R. Brower, Latham, and
Stanley J. Bessmer, Cohoes, N.Y., assignors to General
Electric Company, a corporation of New York
No Drawing. Filed Dec. 28, 1964, Ser. No. 421,663
6 Claims. (Cl. 260—18)

ABSTRACT OF THE DISCLOSURE

Non-skid weather resistant coating compositions comprising a mixture of a silanol-terminated diorganopolysiloxane convertible to the solid, cured, elastic state, an inorganic semi-reinforcing filler, a solvent, and a major portion of sand which has been pretreated with a hydrolyzable organosilicon compound. These compositions are curable to the solid, elastic state, and are particularly useful as coatings for substrates where nonskid, abrasion resistant, flexible, conformable, weatherable coatings are required.

---

This invention relates to coating compositions. More particularly, this invention relates to resilient, non-skid traffic deck coating compositions.

The need for non-skid coatings has long been recognized in the art and non-skid coatings are found, for example, on stairways, on walkways, on roadways and the like. The presently available non-skid coatings generally comprise particles of cemented silicon carbide in a concrete matrix, rough or corrugated concrete surfaces, rough sheets of rubber, paints containing rough aggregates or sheets or rubber containing hard particles of various types therein.

The disadvantages of the present non-skid coatings are several-fold. Many of these coatings are non-resilient and, therefore, tend to crack. Others of the coatings are not weather and ozone resistant. For example, conventional rubber filled with abrasive particles does not stand up well under atmospheric conditions. Furthermore, such coatings become very brittle and tend to crack upon exposure to cold weather. In addition, with respect to rubber matrix coating compositions, the amount of abrasive material which can be incorporated into the rubber is relatively low. Finally, it is extremely difficult to apply non-skid precured rubber coatings to irregular surfaces since such coatings generally must be pre-formed and then cut into shape and applied to the desired surface. This again limits the types of surfaces to which such coatings are applicable.

The present invention is based on our discovery of a coating composition useful in preparing non-skid coatings, which coating composition results in a flexible coating composition highly resistant to abrasion, having excellent non-skid properties, being flexible, being conformable to any underlying surface, being applicable to any type of underlying surface, and being resistant to weathering, ozone and chemical attack.

The coating composition of our invention comprises a mixture of (1) an organopolysiloxane convertible at room temperature to the solid, cured, elastic state, (2) a semi-reinforcing filler, (3) a solvent, and (4) dry, silane-treated sand. This composition is employed as a mixture having a consistency satisfactory to permit troweling. Cross-linking agents and curing agents are added to promote the conversion of the organopolysiloxane to the solid, cured, elastic state.

The organopolysiloxane convertible at room temperature to the solid, cured, elastic state is a well known type of material and is the base polymer used in many room temperature vulcanizing silicone rubbers. In particular, these organopolysiloxanes are silanol chain-stopped diorganopolysiloxanes having a viscosity of from about 1,000 to 100,000 centistokes at 25° C. These silanol chain-stopped diorganopolysiloxanes have the formula:

(1)
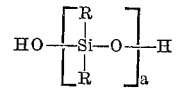

where R represents a monovalent hydrocarbon radical, generally a monovalent hydrocarbon radical free of aliphatic unsaturation, and has a value greater than 1, e.g., from 2 to 100 or more. Illustrative of the radicals represented by R are alkyl radicals, e.g., methyl, ethyl, propyl, butyl, octyl, etc. radicals; aryl radicals, e.g., phenyl, tolyl, xylyl, naphthyl, etc. radicals; aralkyl radicals, e.g., benzyl, phenylethyl, etc. radicals; as well as various halogenated monovalent radicals. The preferred silanol chain-stopped diorganopolysiloxanes within the scope of Formula 1 are compositions in which the majority of the R radicals are methyl radicals. In the event that other than methyl radicals are represented by R, it is preferred that the remaining radicals be phenyl radicals. Preferably, the silanol chain-stopped diorganopolysiloxanes are silanol chain-stopped dimethylpolysiloxanes. As a second choice, the materials within the scope of Formula 1 are copolymers containing at least 80 mole percent dimethylsiloxane units and a minor percentage of diphenyl-siloxane units.

The silanol chain-stopped diorganopolysiloxanes within the scope of Formula 1 are well known in the art and are conveniently prepared by the rearrangement and condensation of one or more cyclic diorganopolysiloxanes, such as a cyclic dimethylpolysiloxane or a mixture of a cyclic dimethylpolysiloxane and a cyclic diphenylpolysiloxane, to form a high molecular weight linear diorganopolysiloxane. This high molecular weight linear diorganopolysiloxane is prepared in the presence of small amounts of siloxane rearrangement and condensation catalysts, such as from about 0.001 to 0.01 percent, by weight, of potassium hydroxide. This results in the preparation of a high molecular weight viscous gum which can then be treated with steam to reduce its viscosity to the desired range of from about 1,000 to 100,000 centistokes at 25° C. Silanol chain-stopped diorganopolysiloxanes of the type described above are shown, for example, in Patent 2,843,555—Berridge, and in Patent 2,607,792—Warrick, both of which are incorporated by reference into the present application for the purpose of describing the preparation of such silanol chain-stopped diorganopolysiloxanes. For purposes of brevity the silanol chain-stopped diorganopolysiloxanes will often be referred to hereinafter as "silanol polymers."

The semi-reinforcing fillers employed in preparing the compositions of the present invention are also well known in the organopolysiloxane art and generally comprise inert inorganic finely divided materials having a surface area less than about 25 square meters per gram, e.g., from about 1 to 25 square meters per gram. The semi-reinforcing fillers tend to strengthen the final composition, but do not impart such a high degree of reinforcement to the unfilled silicone rubber so as to render the uncured composition too stiff for application.

Satisfactory semi-reinforcing fillers include any type of finely divided material having the particle size range previously described. These fillers include, but are not limited to, titanium dioxide, lithopone, zinc oxide, zirconium silicate, iron oxide, diatomaceous earth, calcium carbonate, silica, etc. The preferred semi-reinforcing filler is ground quartz having a surface area of from 1 to 25 square meters per gram. The amount of the semi-reinforcing filler present in the compositions of the present invention is from about 100 to 600 parts semi-reinforcing filler per 100 parts by weight of the silanol polymer.

The solvent employed in the composition of the present invention maintains a reasonably low viscosity for the composition. Upon the final application of the composition of the present invention to the desired surface, the solvent evaporates, thus increasing the viscosity of the composition. Evaporation of the solvent tends to cause shrinkage of the matrix surrounding the solid components of the composition during the conversion of the silanol polymer to a silicone rubber. Shrinkage of the matrix tends to expose the aggregate and provide a rough surface which enhances the non-skid characteristics of the cured compositions of the present invention.

Suitable solvents for use in the practice of the present invention include substantially any relatively volatile liquid of low viscosity which is inert with respect to the reactants. Generally such solvents have a boiling point of less than about 200° C. Illustrative of such solvents are hydrocarbon solvents such as benzene, toluene, xylene, mineral spirits, etc.; halogenated solvents such as tetrahydrofuran, methyl ethyl ketone, and the like; and halogenated solvents such as carbon tetrachloride, perchloroethylene, trichloroethylene, perchlorofluoroalkanes, etc., and alcohols such as propanol, isopropanol, butanol, etc.

The amount of solvent employed in the practice of the present invention is any amount which is satisfactory to produce a solution of desirable viscosity. Experience has shown that a satisfactory viscosity in the composition prepared by mixing the silanol polymer, the semireinforcing filler, and the solvent, is a viscosity in the range of from about 2,000 to 20,000 centipoises at 25° C. The specific amount of solvent necessary to provide such viscosity is to some extent a function of the particular solvent or group of solvents employed, a function of the particular starting silanol polymer, and a function of the type and amount of particular semi-reinforcing filler. However, generally the solvent is present in an amount equal to from about 30 to 90 parts by weight per 100 parts by weight of the silanol polymer.

The sand employed in preparing the compositions of the present invention is common sand which consists primarily of quartz, but which can include minor proportions of other materials, such as mica, felspar, and other similar minerals. The sand employed in the practice of the present invention is for the purpose of giving both skid resistance and wear properties to the composition. To accomplish these results, it is found that the sand should have a hardness of at least about 5 on the mho scale, i.e., a hardness of from about 5 to 8 on such scale. The sand should not have any significant proportion of extremely coarse particles or of extremely fine particles. In general, it is found that satisfactory sands are those having 100 percent of their particles sufficiently small so that they would pass through a No. 20 U.S. Standard Sieve, but sufficiently large so that they are retained by a No. 200 U.S. Standard Sieve.

As previously mentioned, the sand employed in the practice of the present invention is silane-treated. While the exact chemical result of the silane treatment of sand is not known with certainty, it is known that compositions prepared in accordance with the present invention with treated sand are over four times as resistant to abrasion as and more flexible than compositions prepared from untreated sand. The significance of abrasion resistance is that sand particles do not pull out from, or break off from, the coating compositions of the present invention which employ treated sand, while there is a marked tendency for sand particles to pull out from, or break from, similar compositions which contain untreated sand.

In general, the sand is treated with a hydrolyzable alkylsilane having the formula:

(2) 

where R′ is a lower alkyl radical, e.g., a radical containing up to 7 carbon atoms, such as methyl, ethyl, propyl, butyl, etc.; X is a hydrolyzable group and $n$ has a value of from 1 to 2, inclusive. Illustrative of the hydrolyzable groups represented by X are halogen, e.g., chlorine, bromine, etc.; lower alkoxy, e.g., methoxy, ethoxy, propoxy, butoxy, etc.; acyloxy, e.g., acetoxy, propionoxy, etc.; amine groups, and the like. In the preferred embodiment of our invention, the R′ group is methyl and the radicals represented by X are alkoxy. A preferred specific treating compound employed in the practice of the present invention is methyltriethoxysilane. However, other useful treating materials include, for example, dimethyldichlorosilane, methyltrichlorosilane, dimethyldimethoxysilane, methyltriacetoxysilane, ethyltriaminosilane, etc.

In preparing the silane-treated sand, the sand and the hydrolyzable silane employed in the treatment are mixed by any suitable means and the product resulting from the hydrolysis of the hydrolyzable X groups is removed from the reaction mixture. For example, the sand can be treated with the vapors of the hydrolyzable silane of Formula 2 or the sand can be mixed in a rotary mixer with liquid hydrolyzable silanes of Formula 2. Subsequent to the contact of sand with the hydrolyzable silane, the mixture of sand and silane is exposed to the atmosphere to volatilize the products of the hydrolysis and also to volatilize any unreacted hydrolyzable silane employed in the treatment. The preference for alkyltrialkoxysilanes as the treating silane is because of the ease of removal of the alkanols which results from hydrolysis of the X groups. On the other hand, it is found more difficult to remove hydrogen chloride which results from the use of chlorosilanes or amines or acids obtained from silyl amines or acyloxy silanes, respectively.

While the amount of silane employed in the treatment of the sand is not critical, it is found that satisfactory results are obtained when about 0.5 to 3 percent by weight of the hydrolyzable silane of Formula 2 are employed, based on the weight of the sand being treated. While in theory added water would be required to effect the hydrolysis of the silicon-bonded X groups, it is found in practice that moisture present in the atmosphere provides sufficient water to satisfactorily hydrolyze the X groups so that there is no requirement for the use of additional water. In general, the hydrolyzable silane of Formula 2 is selected so as to boil at a temperature below about 100° C. so as to facilitate removal of any unreacted silane from the sand treatment. However, in practice it is found that little if any unreacted silane is present.

The amount of silane-treated sand which can be employed in the compositions of the present invention provides one of the totally unexpected and unpredictable features of the present invention. The compositions of the present invention employ a great amount of sand, there being employed generally from about 200 to 1200 parts of the treated sand per 100 parts of the silanol chain-stopped dimethylpolysiloxane. This range is greater than the range that can be used with conventional hydrocarbon rubber. The compositions of the present invention exhibit optimum properties with this unusually high loading of sand.

When the combination of the sand plus the semi-reinforcing filler is considered, it is seen that the compositions of the present invention contain at least about 300 parts of filler material per 100 parts of the silicone polymer. While we do not wish to be bound by theory, it is believed that in the cured compositions of the present invention, particles of treated sand are very close to each other so that in the final cured composition, support for the coating layer is through sand particles rather than through a polymeric matrix. However, the nature of the polymeric materials is such that even under both tensile and compressive strain, the composition exhibits a high degree of strength.

Strength is, of course, also imparted to the composition of the present invention by the semi-reinforcing fillers described above. Generally, the presence of the semi-reinforcing fillers produces a silicone rubber composition having a Shore A hardness in the range of from 60 to 100, and preferably from 80 to 100. This hardness is found in the composition even without the addition of the silane-treated sand, and the presence of the silane-treated sand does not materially affect the hardness of the cured silicone rubber composition.

As mentioned earlier, the compositions of the present invention employ a cross-linking agent and a curing agent to convert the compositions from the trowelable state to the solid, cured, elastic state. In general, the cross-linking agents and curing agents are identical to those described in Patent 2,843,555—Berridge. The cross-linking agents are generally organic silicates and the curing agents are generally metal salts of organic carboxylic acids.

The organic silicates used in curing the compositions of the present invention are well known in the art and are selected from the class consisting of (a) monomeric organo-silicates corresponding to the general formula:

(3) 

and (b) liquid partial hydrolysis products of the aforementioned monomeric organosilicates, where Y is a member selected from the class consisting of alkyl radicals and halogenated alkyl radicals and Y' is a member selected from the class consisting of alkyl radicals, aryl radicals, aralkyl radicals, alkaryl radicals, alkoxy radicals, aryloxy radicals and halogenated derivatives of the aforesaid alkyl, aryl, aralkyl, alkaryl, alkoxy and aryloxy radicals.

Included within the radicals represented by Y and Y' in Formula 3 can be mentioned, for example, methyl, ethyl, propyl, isopropyl, butyl, amyl, isoamyl, octyl, isooctyl, decyl, dodecyl, beta-chloroethyl, etc. radicals. Also included with the radicals represented by Y' can be mentioned, for example, ethoxy, propoxy, butoxy, nonoxy, phenyl, tolyl, xylyl, benzyl, phenylethyl, naphthyl, anthracyl, biphenyl, phenoxy, t-bromophenoxy, beta-chloroethoxy, etc. radicals. The halogens, for example chlorine, bromine, etc., may be attached to any position in the alkyl group or the aryl group and can comprise any number of halogens. When halogen is attached to an alkyl group in either the Y or Y' radical, it is preferred that the halogen be attached to a carbon atom other than an alpha-carbon atom in order to obtain improved stability of such halogen-substituted alkyl groups.

Illustrative of monomeric alkylsilicates we prefer to employ are compounds corresponding to the general formula:

(4) $(YO)_4Si$ where Y is an alkyl group as defined above.

In addition to employing liquid monomeric organic silicates described above in the practice of the present invention, we can, as described above, also use liquid partially hydrolyzed products derived therefrom. Such hydrolysis products are generally obtained by effecting partial hydrolysis in water of the particular monomeric organosilicate in the presence of small amounts of an acid to a point where it is still water-insoluble and where it is still possible to isolate a liquid, partially hydrolyzed organo-silicon compound. Thus, taking as a specific example a controlled partial hydrolysis of ethyl orthosilicate, the hydrolysis of the latter may be carried out by adding acids or acid-forming metal salts to the liquid monomeric orthosilicate, for instance, ferric chloride, cupric chloride, aluminum chloride, stannic chloride, etc., and thereafter effecting suitable hydrolysis of this mixture of ingredients in water to obtain the two-phase composition from which the water-insoluble, partially hydrolyzed alkylsilicate can be readily separated from the aqueous phase and catalyst.

The organic silicates used as cross-linking agents in the practice of the present invention can be present in varying amounts. In general, we employ from about 0.1 to 10 and preferably from 1 to 5 parts by weight of the organic silicate per 100 parts of the silanol polymer of Formula 1.

The metal salt catalysts employed in the practice of the present invention are well known in the art and are generally salts derived from lead, tin, zirconium, antimony, iron, cadmium, barium, calcium, titanium, bismuth, and manganese. The acid radicals in the salt are generally those yielding the resinate, linoleate, stearate, oleate, or lower acid radicals, such as the acetate, the butyrate, the octoate, etc. Examples of operable metal salts include, for example, tin naphthanate, lead octoate, tin octoate, iron stearate, tin oleate, antimony octoate, tin butyrate, dibutyl tin dilaurate, etc. The proportions of the metal salt employed in practice of the present invention can vary again within fairly wide limits. In general, it is found that satisfactory curing is obtained when the metal salt of the organic carboxylic acid is present in an amount equal to from 0.1 to 5 parts by weight metal salt per 100 parts by weight of the silanol polymer of Formula 1.

In preparing the compositions of the present invention, a mixture is first prepared of the silanol polymer, the filler and the solvent. Generally, the semi-reinforcing filler is first added to the silanol polymer and the solvent is then added to the filled material. Thereafter, the silane-treated sand is added to the mixture of silicone polymer, filler and solvent, and a uniform mixture is prepared. This uniform mixture is shipped to the location at which the composition is to be employed. In the absence of cross-linking and curing agents, this mixture is completely stable and has a substantially infinite shelf life at all general storage temperatures.

The cross-linking agent and catalyst are most conveniently mixed with each other in the desired proportions and at the point of application of the composition, the cross-linking agent and catalyst are mixed into the other components. This mixing operation is continued long enough to insure that any components which may have settled in the mixture are uniformly dispersed. The resulting composition is spread on the surface to be coated by any suitable means.

The most convenient method of spreading the composition on the surface is to use the same techniques used in troweling a regular mortar mix onto surfaces. In general, the composition is applied to the treated surface in a layer at least about 1/16 of an inch thick and often in a layer 1/4 of an inch thick to 1/2 inch, or more. However, the beneficial characteristics of the non-slip coating composition of the present invention are obtained with coatings of 1/16 to 1/4 inch and, therefore, coatings thicker than this are not usually applied. After application of the coating composition to the surface to be coated, the composition cures to the non-slip elastic state in several hours, with complete cure almost always being obtained within 24 hours at room temperature. The exact time required for complete cure is a function of the particular curing catalyst employed, the amount of cross-linking agent and curing catalyst employed. Where desired, a conventional silicone primer can be used to increase the adhesion of the coating to the substrate.

The following examples are illustrative of the practice of our invention and are not intended for purposes of limitation. All parts are by weight.

*Example 1*

Silane-treated sand was prepared from a graded natural silica sand from Ottawa, Ill. This sand conformed to ASTM standard C–109 and consisted of 98 percent of particles retained by a No. 100 U.S Standard sieve, 75 percent retained by a No. 50 sieve, 2 percent retained by a No. 30 sieve, and none retained by a No. 16 sieve. One thousand parts of this sand was mixed with ten parts of methyltriethoxysilane at room temperature and tumbled in a sealed drum for 30 minutes. At the end of this time, the contents of the drum were exposed to the atmosphere at room temperature and ethanol vapor resulting from the hydrolysis of the ethoxy groups was evaporated to produce the treated sand.

A mixture was then prepared by milling 250 parts of ground quartz having an average surface area of about 5 square meters per gram and 5.2 parts of red iron oxide as a coloring agent into 100 parts of a 3,000 centistoke silanol chain-stopped dimethylpolysiloxane fluid. To the resulting milled product was added 62 parts of xylene. This resulted in a mixture having a viscosity of 20,000 centipoises at 25° C. To this mixture was added 620 parts of the methyltriethoxysilane treated sand described above and the mixture was agitated to provide a composition having the consistency of a standard mortar mix.

A cross-linking agent-catalyst composition was prepared by mixing a partially hydrolyzed ethyl orthosilicate having 40 percent available silica and an average of 4 silicon atoms per molecule and dibutyl tin dilaurate in the ratio of 3 parts of the hydrolyzed ethyl orthosilicate to one part of the dibutyl tin dilaurate. Four parts of this mixture was then added to the mixture described above and the resulting mixture was troweled onto a poured concrete floor to form a coating ⅛-inch thick. After 24 hours, this coating had cured to the solid, elastic state. During the curing process the solvent had evaporated, resulting in a minor shrinkage of the cured silicone rubber, thus producing a rough surface which prevented skidding even when water was poured onto the surface.

When the procedure of this Example 1 was repeated, except that the sand employed in the composition was untreated, the resulting material exhibited non-skid properties, but was not abrasion resistant. As foot traffic went across the treated floor, particles of sand would break loose from the surface of the coating and this continued until all surface particles of sand were removed and at this point the composition ceased to be skid-resistant. On the oher hand, the skid-resistance of the compositions of the present invention remained unchanged after repeated exposure to foot traffic. Measurement of abrasion resistance of both of these compositions with a Tabor abrader showed that the abrasion resistance of the compositions of the present invention was over four times as great as that prepared with untreated sand. This concrete was as skid resistant as a concrete roadway surface.

Other portions of the compositions described above were spread on the surface of a cracked and spalled highway surface and because of the trowelable nature of the composition, the cracks were filled and a uniform surface was obtained. Repeated vehicular traffic over this section failed to show any significant deterioration of the surface.

*Example 2*

In this example a composition within the scope of the present invention was prepared from the 3,000 centistoke silanol chain-topped dimethylpolysiloxane of Example 1, 200 parts of the finely ground quartz of Example 1, 10 parts of finely divided titanium dioxide, and 55 parts of xylene. To this mixture was added 550 parts of the methyltriethoxysilane treated sand, and 3 parts of hydrolyzed ethyl silicate and 2 parts dibutyl tin dilaurate. This mixture was troweled onto a concrete walk to a thickness of ⅛ inch and was cured to a white, solid, elastic, skid resistant state at the end of 24 hours.

*Example 3*

In this example the procedure of Example 2 was repeated except that the sand had been treated by mixing 1,000 parts sand, with 25 parts of methyltrichlorosilane in a closed container for 20 minutes and thereafter mixing the material while exposed to the atmosphere for 2 additional hours until all traces of hydrogen chloride had evaporated. A comparable surface coating was obtained.

*Example 4*

In this example the procedure of Example 1 was repeated except that no iron oxide pigment was present. Instead the composition contained 100 parts of silanol polymer, 250 parts of the reinforcing filler, 62 parts of xylane, and 620 parts of the methyltriethoxysilane treated sand. The same curing system was employed to yield a grayish colored composition which troweled onto an asphalt coated roof to produce a tough weather resistant non-skid coating on the roof.

*Example 5*

In this example the procedure of Example 4 was repeated except that the composition contained in addition to the other ingredients, 10 parts of finely divided titanium dioxide. A product comparable to that of Example 4 was obtained except that it was white in color.

*Example 6*

In this example, the procedure of Example 5 was repeated except that various solvents were substituted for the 62 parts of xylene in Example 5. In particular, compositions were made up containing 55 parts toluene, 80 parts mineral spirits, 70 parts isopropanol, and 75 parts trichloroethylene. In each case the resulting products were comparable to those of Example 5.

*Example 7*

In this example, a composition was prepared following the procedure of Example 2 from 100 parts of the silanol terminated diorganopolysiloxane, 400 parts of a finely ground quartz having a surface area between 1 and 5 square meters per gram, 87 parts xylene, and 880 parts of the sand of Example 1 which had been treated with methyltriethoxysilane. Again, comparable results were obtained.

While the foregoing examples have illustrated several of the embodiments of our invention, it is understood that our invention is directed broadly to the preparation of coating compositions from the silanol chain-stopped linear diorganosiloxanes of the viscosity recited, a semi-reinforcing filler, a solvent and a hydrolyzable silane-treated sand. Many variations are possible within the scope of the present invention. In addition to the semi-reinforcing filler, various pigments and coloring agents can be employed in preparing the compositions of the present invention so that any desired color can be produced. Likewise, instead of employing a single silanol-terminated diorganopolysiloxane fluid, a mixture of such fluids can be employed. Similarly, a mixture of semi-reinforcing fillers can be employed and a mixture of different types of treated sands can be employed.

In terms of proportions of components of the present invention, in the preferred embodiment thereof, we employ (1) 100 parts of the silanol-terminated polydiorganosiloxane having a viscosity of from 1,000 to 100,000 centistokes at 25° C., (2) from 100 to 600 parts of semi-reinforcing filler having a surface area of from about 1 to 25 square meters per gram, (3) from 30 to 90 parts of solvent and (4) from about 200 to 1,200 parts of the silane-treated sand having the specified sieve size and hardness. Cross-linking agents and catalysts are present in the composition of the present invention in the proportions of from about 0.1 to 10 parts of the cross-linking agent and from 0.1 to 5 parts of the catalyst per 100 parts of the silanol-terminated silicone polymer.

The compositions of the present invention are useful as a traffic topping for flat and slanted roofing, as non-skid surfaces for kitchen floors and the like, for the repairing of spalled concrete surfaces, as protective coatings for concrete bridge surfaces, as decorative coatings for interior and exterior walls, as non-skid coatings for marine applications, as surface coatings for airport runways, and the like.

What we claim as new and desire to secure by Letters Patent of the United States is:

1. A non-skid composition comprising by weight (1) 100 parts of a silanol-terminated diorganopolysiloxane convertible at room temperature to the solid, cured, elastic state, (2) from 100 to 600 parts of an inert inorganic semi-reinforcing filler, (3) from 30 to 90 parts of a solvent and (4) from 200 to 1200 parts of sand which has been treated prior to incorporation into said composition with a silane having the formula:

$$R'_nSiX_{4-n}$$

where R' is a lower alkyl group, X is a member selected from the class consisting of halogen, lower alkoxy, acyloxy, and amine groups, and $n$ has a value of from 1 to 2, inclusive.

2. A non-skid composition comprising by weight (1) 100 parts of a silanol chain-stopped diorganopolysiloxane, (2) from 100 to 600 parts of an inert inorganic semi-reinforcing filler having a surface area from about 1.0 to 25 square meters per gram, (3) from 30 to 90 parts of a solvent, and (4) from 200 to 1200 parts of a sand having its surface modified by treatment prior to incorporation with a hydrolyzable silane, having the formula:

$$R'_nSiX_{4-n}$$

where R' is a lower alkyl group, X is a member selected from the class consisting of halogen, lower alkoxy, acyloxy, and amine groups, and $n$ has a value of from 1 to 2, inclusive.

3. A non-skid composition comprising, by weight (1) 100 parts of a silanol-terminated dimethylpolysiloxane having a viscosity of from 1,000 to 100,000 centistokes at 25° C., (2) from 100 to 600 parts of a ground quartz filler having a surface area of from about 1 to 25 square meters per gram, (3) from 30 to 90 parts of an organic solvent and (4) from about 200 to 1,200 parts of a dry treated sand having a sieve size greater than U.S. Standard No. 200 sieve and less than No. 20 and having a hardness of from about 5 to 8 mhos, said sand having been treated prior to incorporation into said composition with methyltriethoxysilane.

4. A skid-resistant solid, cured, elastic composition prepared by curing of a mixture of ingredients comprising, by weight (1) 100 parts of a silanol chain-stopped dimethylpolysiloxane, (2) from 100 to 600 parts of a ground quartz filler having a surface area of from about 1.0 to 2.5 square meters per gram, (3) from 30 to 90 parts of a solvent selected from the class consisting of benzene, toluene and xylene, (4) from about 200 to 1,200 parts of a treated sand having a sieve size greater than U.S. Standard No. 200 and less than sieve No. 20 and having a hardness of from 5 to 8 mhos, said sand having been treated prior to incorporation into said composition with methyltriethoxysilane, (5) from 0.1 to 10 parts of a polyethyl silicate and (6) from 0.1 to 5 parts dibutyl tin dilaurate.

5. A solid, cured, elastic composition prepared by curing a mixture of ingredients comprising, by weight (1) 100 parts of a silanol chain-stopped diorganopolysiloxane having the formula:

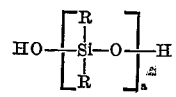

where R represents a monovalent hydrocarbon radical free of aliphatic unsaturation and $a$ has a value greater than 1, (2) from 100 to 600 parts of a semi-reinforcing filler having a surface area of from about 1.0 to 25 square meters per gram, (3) from 30 to 90 parts of a solvent, (4) from about 200 to 1,200 parts of treated sand having a sieve size greater than U.S. Standard sieve No. 200 and less than No. 20 sieve and having a hardness of from 5 to 8 mhos, said sand having been treated with methyltriethoxysilane prior to incorporation into said composition and containing the residue of the hydrolysis thereof, (5) from 0.01 to 10 parts of an organic silicate selected from the class consisting of (a) monomeric organosilicates corresponding to the general formula:

where Y and Y' are members selected from the class consisting of alkyl groups and halogen-substituted alkyl groups and Y', in addition, represents a member selected from the class consisting of aryl, aralkyl, alkaryl, alkoxy and aryloxy groups and halogenated derivatives of the aforesaid aryl, aralkyl, alkaryl, alkoxy and aryloxy groups, and (b) liquid partial hydrolysis products of the aforementioned monomeric organosilicates and (6) from 0.1 to 5 parts of a metallic salt of an organic monocarboxylic acid in which the metal ion is selected from the class consisting of lead, tin, zirconium, antimony, iron, cadmium, barium, calcium, titanium, bismuth, and manganese.

6. A coated surface comprising a substrate having thereon a coating of at least 1/16-inch thick of the cured composition of claim 5.

References Cited
UNITED STATES PATENTS

| | | | |
|---|---|---|---|
| 2,643,964 | 6/1953 | Smith-Johannsen | 260—37 X |
| 2,665,264 | 1/1954 | Brooks et al. | 260—37 X |
| 2,843,555 | 7/1958 | Berridge | 260—37 X |
| 2,859,198 | 11/1958 | Sears et al. | 260—37 |
| 2,925,831 | 2/1960 | Welty et al. | 117—100 |
| 3,004,859 | 10/1961 | Lichtenwalner | 260—37 X |
| 3,041,156 | 6/1962 | Rowse et al. | 51—298 |

FOREIGN PATENTS 844,128  8/1960  Great Britain.

DONALD E. CZAJA, *Primary Examiner.*

C. W. IVY, *Assistant Examiner.*